Feb. 14, 1961  W. VON STOESER  2,971,416
MEASURING-TYPE STRIP-FEEDING MACHINE
Filed Dec. 31, 1954  7 Sheets-Sheet 3
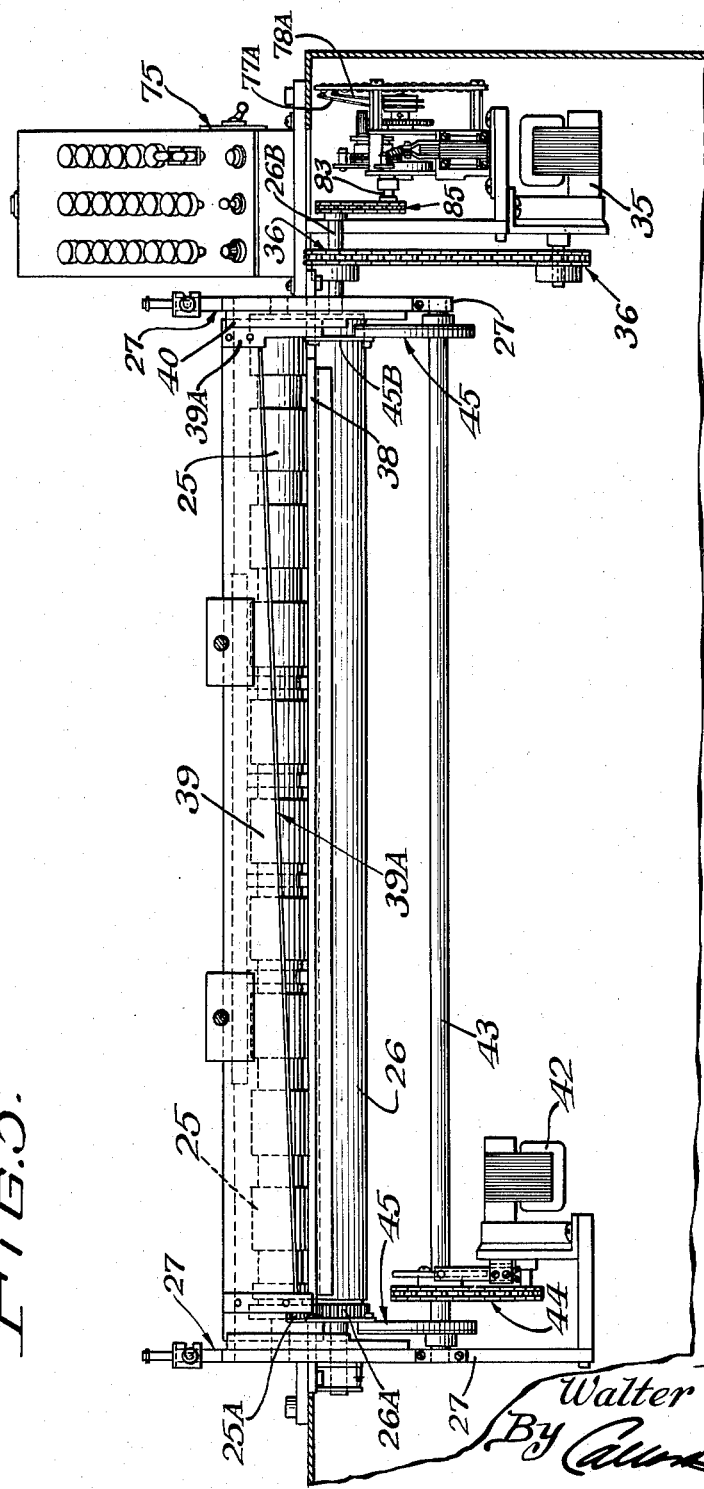
Inventor:
Walter Von Stoeser
By [signature]
Atty.

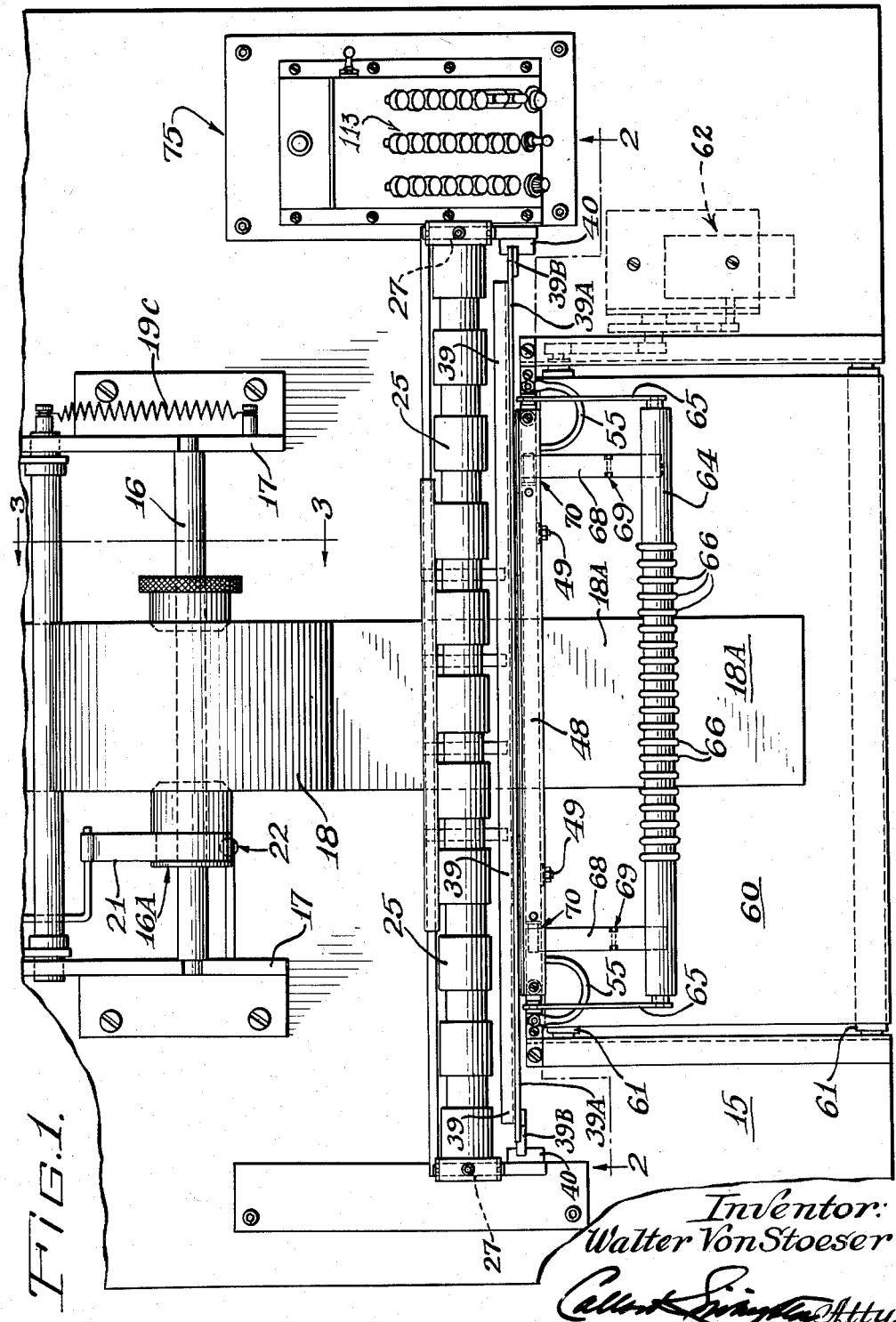

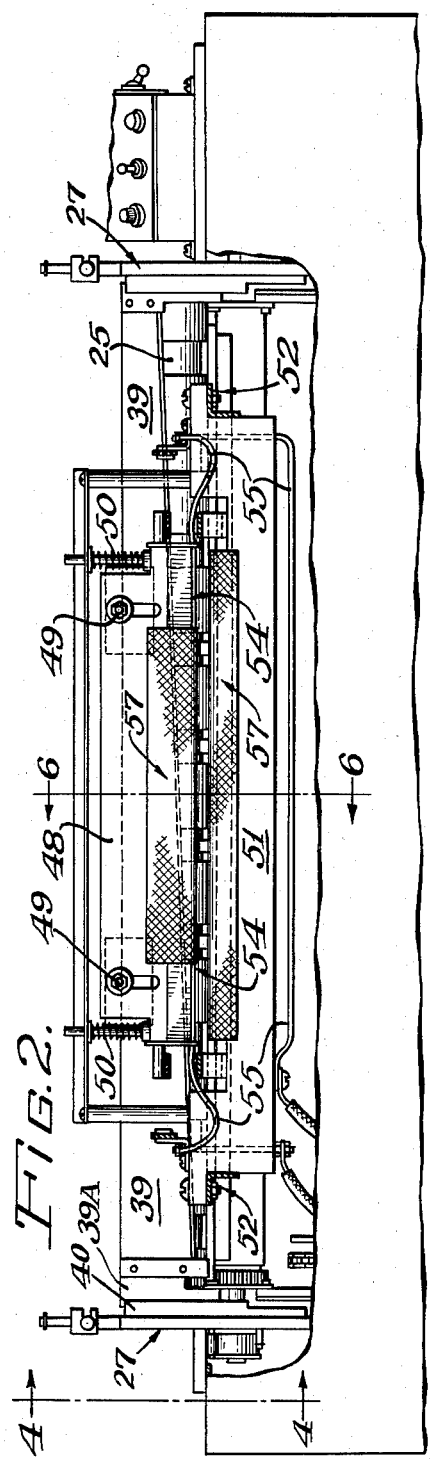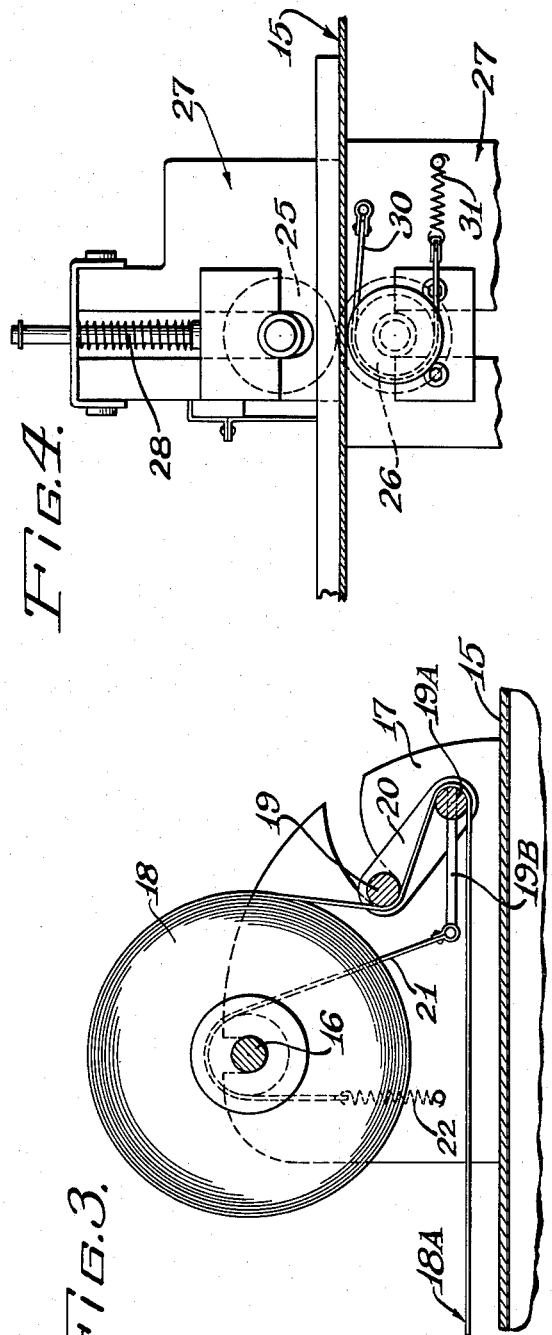

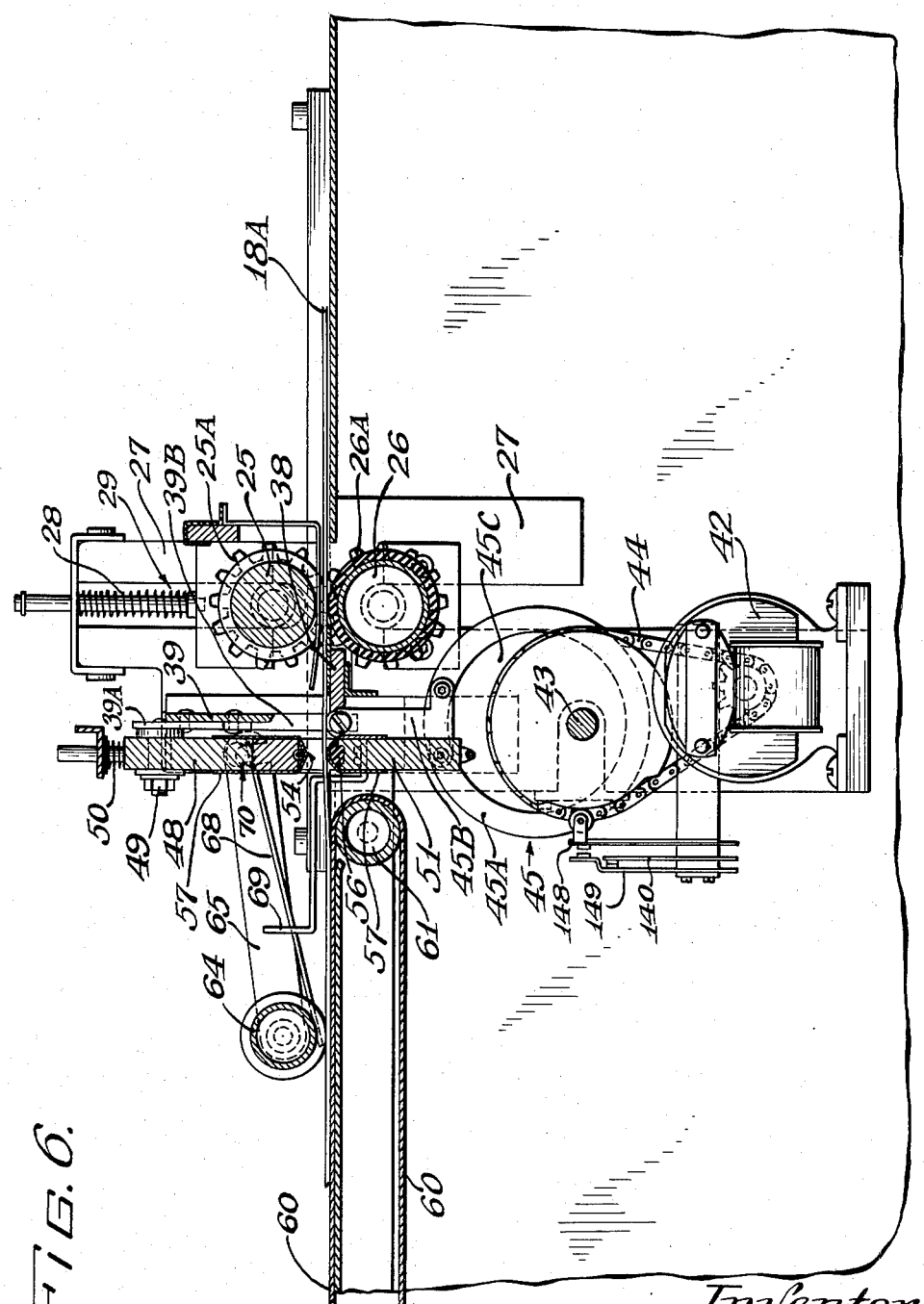

Feb. 14, 1961 W. VON STOESER 2,971,416
MEASURING-TYPE STRIP-FEEDING MACHINE
Filed Dec. 31, 1954 7 Sheets-Sheet 5

Inventor:
Walter Von Stoeser
By
Atty.

Feb. 14, 1961 W. VON STOESER 2,971,416
MEASURING-TYPE STRIP-FEEDING MACHINE
Filed Dec. 31, 1954 7 Sheets-Sheet 6
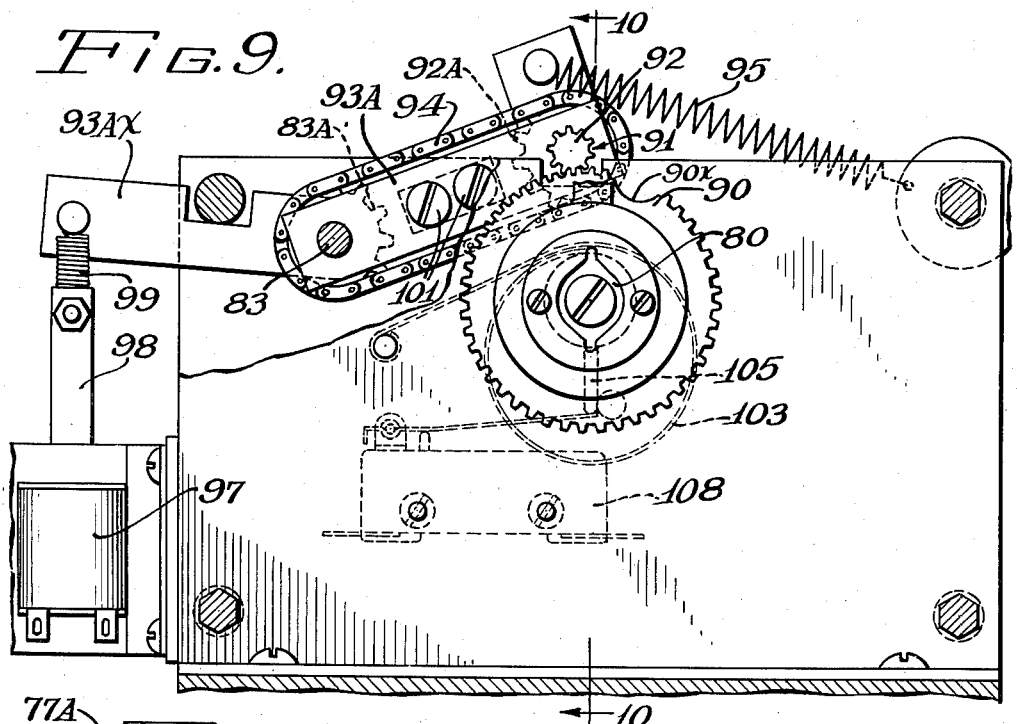
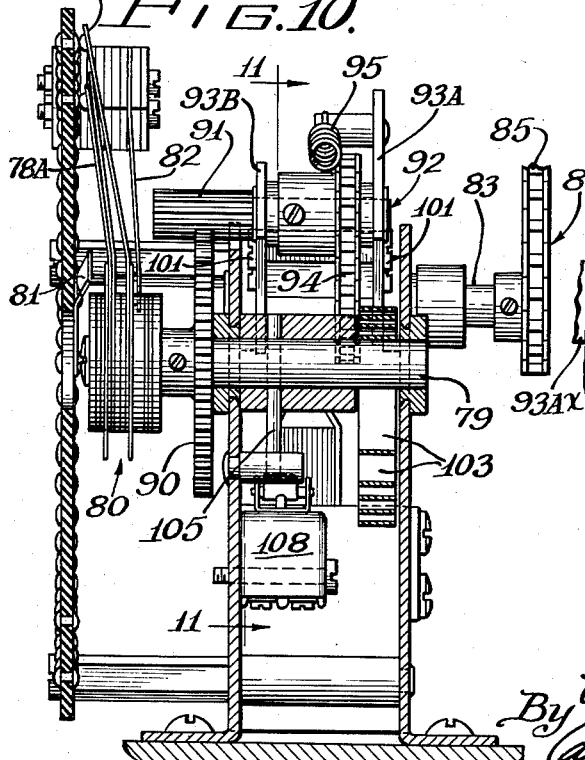
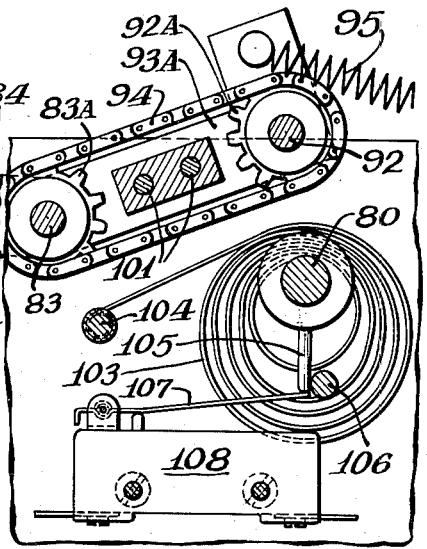
Inventor:
Walter Von Stoeser United States Patent Office 2,971,416
Patented Feb. 14, 1961

2,971,416
MEASURING-TYPE STRIP-FEEDING MACHINE

Walter Von Stoeser, Lake Villa, Ill., assignor to Lectromatic Devices, Inc., Chicago, Ill., a corporation of Illinois Filed Dec. 31, 1954, Ser. No. 478,991
6 Claims. (Cl. 83—155)

The present disclosures relate to improvements in a combination sheet-feeding, bag-making, and sealing machine with selective measuring and automatic cut-off features, the machine being intended for use in bagging and enwrapping merchandise in plastic sheet material of the class of polyethylene film.

Some of the more detailed objects and features of improvement relate to a motor-driven feeding means for feeding desired lengths of plastic sheeting or flat tubular stock onto a delivery table; and a combination knife and heat-sealing device which is operative to seal the tubular stock laterally and cut it laterally at the sealing region to form a plastic bag open at one end.

Another feature is the provision of a hold-down means cooperable with the combination cutter and sealer for holding the fed lengths of stock motionless prior and subsequent to operation of the knife and the sealing means.

Another object is an improvement in the measuring switch structure to avoid lost motion by having a driving pinion normally in mesh with a mutilated rotary-switch gear so that the measuring action starts at once, the driven pinoin thereafter being withdrawn to terminate the switch action.

Further detailed objects relate to the provision of electrically heated sealing means carried with the cut-off knife yieldingly in advance of the latter so that the sealing operation is started ahead of the cutting operation; and to the coaction of the feed-roller motor and a separate outfeed conveyor belt motor; and to features of the selecting-switch and measuring-switch circuits including an increment control by which fractional length units may be had; and to the instant starting and stopping of the measuring switch contact wipers, all of which will more fully appear hereinafter as the following description proceeds in view of the annexed drawings, in which:

Fig. 1 is a top plan view, partially broken away, of the new preselecting sheet-feeding and bag-making machine;

Fig. 2 is a fragmentary, elevational detail of the heat-sealing and cut-off means taken in the direction of lines 2—2 of Fig. 1;

Fig. 3 is a side elevation of the sheet supply roll and brake means looking in the direction of lines 3—3 of Fig. 1;

Fig. 4 is a vertical sectional detail to enlarged scale showing in elevation the journaling of the feed rollers at one end thereof, as seen in the direction of lines 4—4 of Fig. 2;

Fig. 5 is a front elevational view of parts of the feed-roller and shearing mechanism (seen also partially in Fig. 1) together with parts of the measuring switch mechanism;

Fig. 6 is a fragmentary vertical section, to enlarged scale, showing particularly the feeding, shearing, and sealing mechanism as seen along lines 6—6 of Fig. 2;

Fig. 9 is an enlarged elevational detail of part of the measuring-switch mechanism;

Fig. 10 is a section taken along lines 10—10 of Fig. 9 showing the measuring wipers and rockable drive pinion;

Fig. 11 is a fragmentary elevational detail of the index switch means in the measuring unit;

Figure 7:
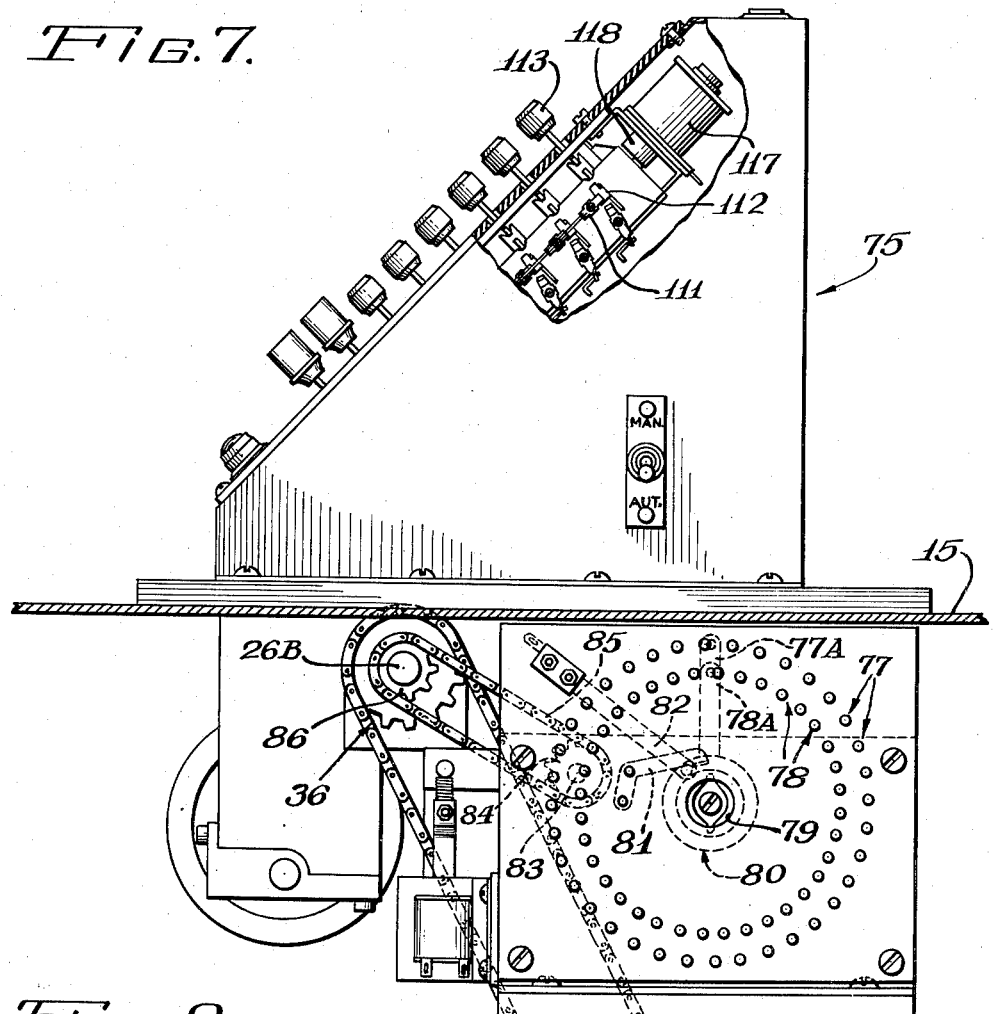
Fig. 7 is a sidewise elevational detail, to enlarged scale, of the preselective measuring switch unit and measuring switch mechanism with parts broken away to show a portion of the selecting-switch button arrangement.

In one commercial embodiment, the novel sheet-feeding and bag-making mechanism is housed in a console-type cabinet of counter height for use in stores, shipping rooms, and the like, the supply roll of plastic sheet material and certain feed-roller and selective control apparatus being disposed (as in Fig. 1) upon a table-top 15 of the cabinet.

A supply-roll spindle 16 is removably seated in journal brackets 17, the construction of which is shown in Fig. 3, this spindle being adapted to carry a roll 18 of plastic or like sheet material or flattened tubular plastic bag-making stock.

As shown in Fig. 3, the web 18A from this supply roll is led around a pair of rockable tensioning rods 19, 19A, joined by straps 20 and spanning the distance between said journal brackets, the ends of the rod 19A being pivotally seated in said brackets, while the ends of the other rod are free to rock in open-ended arcuate slots 17A.

Brake means for the supply roll includes a belt 21 passing over a brake-drum collar 16A (Fig. 1) adjustably positionable on shaft 16, said belt being attached at one end to a traction spring 22, and at its opposite end to an offset radial pin 19B on rod 19A, the action of these members being such that when the tensioning rods rock counterclockwise (Fig. 3) under urgence of the spring 19C (Fig. 1) in web-tensioning action, the brake strap or belt 21 is likewise yieldingly tightened against the drum collar and applies a suitable drag to the material roll 18 by reason of frictional engagement of a drum collar 16A in the case of the roll 18, there being another adjustable collar 16B on the shaft engaging the opposite side of the roll bore so that the roll is clamped between the two collars.

As depicted in Fig. 6, the web 18A is led between upper and lower feed rollers 25 and 26 seated in journal blocks 27 carried on the table top 15 and having portions extending above and below the latter, as in Figs. 4, 5, and 6. The upper feed roller 25 is yieldable by reason of being pressed by springs 28 down into vertical bearing slots 29 (Fig. 6) toward the companion feed roller. A brake means 30, 31, similar to that previously described in view of Fig. 3, is applied to the lower feed roller in the manner shown in Fig. 4, and is effective on both rollers since the latter are mutually interdriving through gears 25A, 26A (Figs. 5 and 6).

Means for driving the feed rollers includes (Fig. 5) a feed motor 35 driving the lower feed roller spindle 26B through sprocket means 36.

Cut-off or shearing means includes a long stationary shear or knife blade 38 (Fig. 6) fixed in a horizontal plane at the level of the table top at the outfeed side of the two feed rollers, together with a vertically reciprocable guillotine shear blade 39 (Figs. 5 and 6) mounted on a carrier cross bar 39A attached to slide blocks 39B at its opposite ends with said blocks riding in the vertical grooves of a pair of channel members 40 carried on the journal brackets 27 (Figs. 1 and 5).

The movable shear is reciprocated by a cutter or knife motor 42 (Figs. 5 and 6) driving a countershaft 43 through sprocket means 44, said shaft having a pair of ring-cam cranks 45 at opposite ends thereof, one of these ring cams being seen in elevation in Fig. 6 and consisting of a ring 45A to which a crank link 45B from knife carrier 39A is attached, there being a cam disc 45C rotatable within said ring by the countershaft.

Movable with the reciprocable knife means is a heat-sealing means shown to advantage in Fig. 6 and including a thick cross plate 48 of electrically and thermally non-conductive material of the phenolic resin class which is secured as at 49 to slide vertically up and down on the knife carrier bar 39A (Fig. 2).

A set of presser springs 50 (Figs. 2 and 6) normally urge the movable heater-bar assembly downward below the level of the knife 39 and toward a stationary companion bar 51 secured to extend below the table top, as at 52 (Fig. 2).

The lower longitudinal edge of the movable heater bar is grooved to seat a long heating conductor 54 (Fig. 6) of special but commercially available alloy having a relatively constant temperature to current characteristic, and which is connected, as by conductors 55 (Fig. 2), in a heating circuit to be further described.

As seen in Fig. 6, a long metal backer rod 56 is seated in a groove in the upper edge of the stationary heater plate to afford a good pressing base against which the movable heater member, and especially the sealing conductor 54, can press the web material 18A.

To prevent sticking of the plastic webbing 18A to either of the heater members, both of the latter are covered with a fibre glass apron 57 (as in Fig. 2).

Withdrawal of the severed lengths of sheeting or sealed bags is facilitated by provision of a continuous outfeed belt 60 (Figs. 1 and 6) trained over rollers 61 by outfeed motor 62 with the upper surface of the belt substantially flush with the table top 15, so that the operator needs merely press his fingers against the severed piece and draw it forward with the belt 60 easily moving toward him. This outfeed belt is preferably made of woven fibre glass or like material and serves to obviate the delay and annoyance of having the severed pieces of sheeting stick to the table or bed because of static electric charges.

An automatic hold-down means is provided (Figs. 1 and 6) in the form of a roller 64 carried at the ends of a pair of rocker arms 65, rubber rings 66 being spaced along the roller 65 to reduce the roller contact area while giving good bearing pressure against the webbing.

To relieve the pressure of the hold-down roller means while cutting and sealing operations are in progress, automatic lifter means is provided in the form of a pair of lifter levers 68 (Figs. 1 and 6) rockably seated on bracket arms 69 with their forward ends beneath the hold-down roller and their rearward ends engaged loosely in slots, as at 70, in the movable heater block 48. Thus, when the heater block or plate 48 descends along with the shear blade, lifters 65 rock clockwise (Fig. 6) and raise the hold-down roller 64 so that the webbing to be cut is relatively free to shift as the knife and heater elements contact it, but the severed portion will nevertheless be seized and held by the roller means 64, 66 when the knife and sealer assembly rises at the conclusion of the operating cycle.

The preselective measuring switch and circuit control means disclosed herein has some features which are common to the measuring and cut-off mechanisms disclosed in my copending applications, Serial Nos. 168,565 and 319,672, now matured respectively into Patents Nos. 2,748,861 and 2,785,748, as well as some new features contributing to improved measuring functions in a machine of the class described.

The measuring control unit generally indicated at 75 is mounted, as in Fig. 1, on the cabinet top to the right of the feeding, sealing, and cutting mechanism, portions of the measuring device being located, however, pendantly within the console, as shown in Fig. 7, including particularly a rotary switch means having two concentric banks of contact buttons 77, 78, representing different lengths of sheeting to be fed.

The outer bank of contacts 77 represents unit lengths in inches, while the inner ring of contacts 78 represents fractional increments to the half-inch, each bank being contacted by a corresponding rotary wiper blade 77A or 78A carried on a shaft 79, as in Fig. 10. Circuit contact with these wipers is established through insulated commutator discs 80 and a pair of spring wiper blades 81, 82 (Figs. 7 and 10).

As seen in Figs. 7 and 10, the rotary switch unit includes a countershaft 83 with a sprocket 84 fast thereon and driven through a sprocket chain 85, which in turn is trained over another sprocket 86 on the main feed roll countershaft 26B, which is driven, as heretofore explained, by motor 35. The general location of these components is also depicted in Fig. 5.

Referring to Figs. 9 and 10, the main measuring switch shaft 79 has affixed thereto a driven gear 90 meshing, normally, with a driving pinion 91 on a stub shaft 92 journaled on a pair of rocker plates 93A, 93B (Fig. 11, also), plate 93A being rockably carried by the small countershaft 83, the latter being drivingly interconnected with stub shaft 92 by a short sprocket chain 94 working on sprockets 83A and 92A on the respective shafts.

Thus, by pivoting the rocket plate 93A (Fig. 9) the drive pinion 91 is moved into and out of engagement with the driven mutilated gear 90, there being a spring 95 (Fig. 9) normally acting to pivot the rocker assembly home with pinion 91 engaged in gear 90.

Means for pivoting the rocker pinion out of home or normal position includes (Fig. 9) a solenoid 97 having plunger link 98 connected through a spring 99 to an extension or lever 93AX of rocker plate 93A, it being observed that the latter and the plate 93B are tied together by screws 101, so that when the solenoid is energized lever 93AX pivots counterclockwise and so does its counterpart 93A, thus disengaging pinion 91 from the driven mutilated gear 90.

Means for restoring the wiper shaft 79 to a starting position includes a clockspring 103 connected thereto (Figs. 10 and 11) and anchored as at 104.

A radial stop or index pin 105, fast on said shaft, abuts a stop pin 106, and in this position also bears upon a spring operating lever 107 for a sensitive index switch 108.

The driven wiper-shaft gear 90 is mutilated to afford an idling notch 90X (Figs. 10 and 12) into which the pinion 91 drops out of driving engagement with the teeth thereof to avoid stripping in event of a jam and also when the pin 105 engages the stop 106, which can occur when continuous random lengths beyond the angular capacity of the rotary switch are fed, as will be explained.

Figure 8:
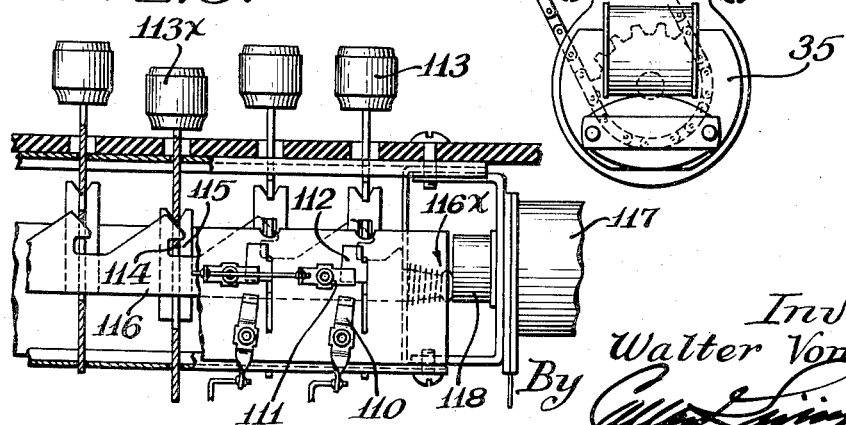
Fig. 8 is an enlarged fragmentary sectional detail of the selecting-switch button mechanism also seen partly in Fig. 7.

Each selector contact button 77 is connected to a corresponding selector switch contact, such as contact 110 in Figs. 7 or 8, which will be interconnected with a common power contact 111 by downward movement (Fig. 8) of a bridging contact 112 responsive to depression of a corresponding length-selecting button 113, the latter and associated switches constituting a starting switch means.

In Fig. 8 the button 113X is shown depressed, and any such button will be automatically locked in this condition by a detent 114 engaged in the locking notch 115 of a common lock bar 116 normally urged toward the right for locking action by spring means (not seen) in the well-known manner, such gang switches being available on the market.

Release of any depressed and locked selector button may be effected by actuating another such button or by energizing a reset solenoid 117 (Figs. 7 and 8) to cause its plunger head 118 to move toward the left and push the common lock bar at 116X toward the left and free any detent such as 114 for spring return of the depressed button.

Operation

Figure 12:
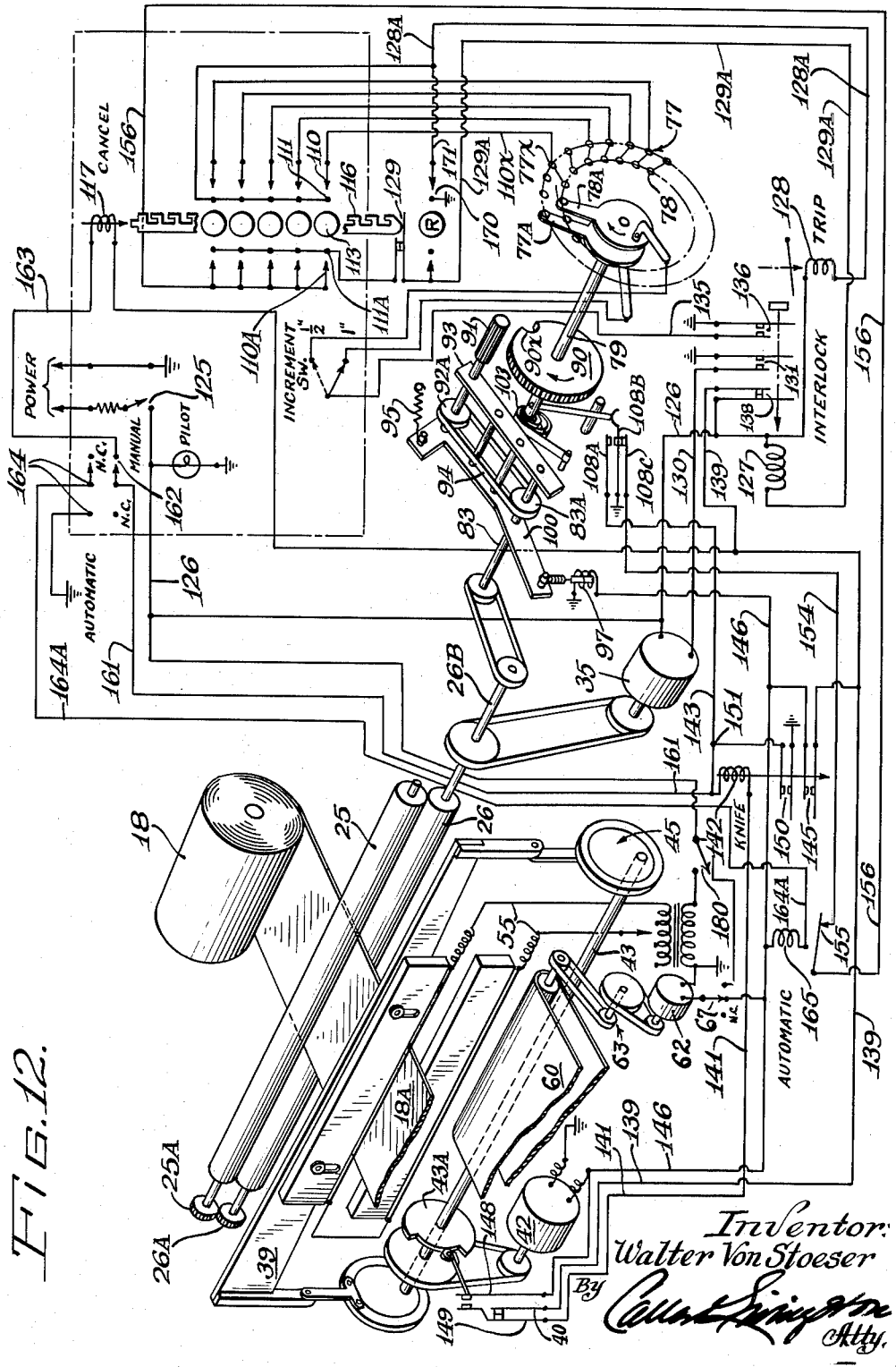
Fig. 12 is a schematic circuit and operating diagram.

Fig. 12 portrays schematically the functional and circuit components to illustrate the operation of the machine. Beginning with the so-called full automatic operation, let it be assumed that the operator desires a four-inch length (usually the shortest) of sheet stock from the roll 18, the following operations ensue.

First, the master line switch 125 is closed to condition the machine for operation generally, thus connecting one side of the power line to the feed motor 35, the interlock relay coil 127, and its trip coil 128.

The operator next pushes the "4-inch" button 113, which becomes latched by the detent bar 116, it being noted that all selector buttons have some overtravel, as does the detnet bar, and the latter is utilized to open a special supervisory switch 129 to break the circuit to the interlock coil 127 via conductor 129A so long as the operator attempts to hold any button fully down; but when he releases the button properly, it will be latched down by the detent or lock bar and switch 129 will close again. This prevents faulty operation by assuring the automatic release of the detent bar when the release or cancellation coil 117 is later pulsed.

As a result of pushing down the selector button 113, the associated contacts 110, 111, and 110A, 111A are respectively closed, the former pairs connecting to the rotary selector switch contacts, generally, while the latter pairs control the interlock relay coil 127. In this example the interlock relay coil 127 will now be energized from conductors 126 and 129A, causing the feed motor 35 to be started by connection of ground via conductor 130 and closure of interlock relay contacts 131 at this time.

It is pointed out that one power terminal is arbitrarily shown in the circuit diagram to be grounded, this being done solely for the purpose of simplifying the wiring diagram to facilitate explanation of operation.

As a result of starting the feed motor 35, the feed rolls 25, 26 are advance the sheeting web 18A beneath the raised knife 39, and at the same time the rotary measuring switch wipers 77A, 78A are being turned over the contact banks by reason of the driving connection from feed roll shaft 26B to the countershaft 83 and thence through the recker-lever drive means 83A, 92A, 94 to the drive pinion 91, which will be normally in mesh with the driven mutilated gear 90, thereby at once rotating the switch wiper shaft 79 and hence the assocciated wiper fingers 77A, 78A, there being no delay since gears 90, 91 are in mesh at the start of each cycle.

Since the exact four-inch length (as distinguished from a four-and-one-half-inch length) is required, the inner ring of contacts 78 are controlling; and in this example closure of selector switch contacts 110, 111 has completed a circuit via conductor 110X to a measuring-switch contact 77X, and when the advancing wiper 77A engages contact 77X, the interlock trip coil 128 will be energized via conductor 128A (which is common to all contacts such as 111), selector contacts 110, 111, conductor 110X to measuring contact 77X, wiper 77A, conductor 133, the closed "one-inch" increment switch contacts 134, conductor 135, and the now closed pair of interlock switch contacts 136 to ground.

Energization of lock-out trip coil 128 causes opening of contacts 131 and 136, thereby stopping the feed motor and breaking the trip-coil circuit from the measuring switch just described; and the next occurrence is the resetting or indexing of the selector and measuring switches and the automatic operation of the knife dependent upon such indexing operation.

When the interlock relay first pulls up, the shear contacts 138 thereon are held open, thus *opening* the circuit for the knife relay and the selector cancellation or release coil 117, as will now appear.

One of the pairs of interlock contacts 138 is connected to power conductor 126, and the other is connected via conductor 139 to one cam switch contact 140, which is closed with contact 141 when the knife cam means 45 on countershaft 43 is normal; and a circuit is thus completed via conductor 141 to one terminal of the knife relay coil 142; however, the other terminal of this coil is connected via conductor 143 to one contact 108A of the index switch on the measuring unit, but the companion ground contact 108B is held away from contact 108A the entire time the measuring switch shaft 79 is turning away from normal starting position because the index pin 105 instantly leaves index contact 108B at the start of any measuring movement, causing the contact 108B to spring away from contact 108C and close one side of the knife relay circuit for the time being via conductor 143.

However, the other side of the knife relay coil circuit via the knife cam switch and conductors 141, 139 is at this time held open at contacts 138 on the interlock relay; and therefore, as soon as the measuring switch wiper travels around to the selected or *hot* contact 77X (in this example), the interlock trip coil 128 will be pulsed via said contact 77X, conductor 110X, selector contact 110, and conductor 128A, so that said open interlock contacts 138 will close, and the knife relay coil 142 will be energized, with the result that the knife motor 42 will start because of closure of knife relay contacts 145, applying power from conductor 139 to conductor 146 to which said motor is connected.

Another result of operation of the knife relay is closure of its contacts 150 to apply a holding ground to itself and the selector cancellation coil 117 at junction 151 with conductor 143, although at this moment a similar ground is being temporarily applied at index contacts 108A, 108B.

Such energization of the knife motor turns the countershaft 43 and the knife cam 43A, causing cam switch contact 148 to close with contact 149 and opening the circuit between the latter and contact 140, which drops out the knife relay coil 142 via conductor 141; and while this would otherwise cause the knife motor to stop because of opening of knife relay contact 145, the latter are shunted now by cam switch carry-over contacts 140, 148 until the cam 43A completes its cycle and reopens said shunt contacts 140, 148, by which time the knife 39 will have severed the web 18A and returned to its elevated normal position.

At the time the knife motor was first started by pulling in of the knife relay and closure of contacts 145, as aforesaid, the index coil 97 was energized via conductor 146, thus rocking the measuring switch drive gear 91 out of driving engagement with the mutilated gear 90 and to restore the measuring switch position, with the result that the index pin 105 again assumes the starting position of Fig. 12 and opens contacts 108A, 108B, so that all operating connection or ground for the knife relay coil 142 and the cancellation coil 117 is removed and the operating ground at index contacts 108B, 108C is restored, this ground or connection being extended via conductor 154 from the index switch to the normally closed *automatic* relay contacts 155, and via conductor 156 to the selector switch contacts, which are common with all contacts such as 110A.

Where the operation is not to be automatic with respect to preselective measuring, a manual switch 160 (Fig. 7) on the side of the selector unit is thrown to "Man" position, with the result (Fig. 12) of breaking the circuit from the index switch via conductors 143, 161, contacts 162, and conductor 163 to the cancel coil 117, thus disabling the latter.

A further result of this operation of the automatic-manual switch is to close contacts 164 thus setting up a ground or operating connection for the *automatic* relay coil 165 via conductor 164A for subsequent use when the knife relay shall be actuated.

The device is now in condition for feeding of random lengths of sheeting, and the operator will hold down the button marked "R" on the selector switch panel thus closing random contacts 170 and applying an operating connection or ground via conductor 171 to conductor 128A to the interlock trip coil 128 so that the latter remains energized as long as the random button is held down; and at the same time a companion pair of random contacts 173 is also held closed, applying power to the interlock relay coil 129 via conductors 174 and 129A.

From this point on, the "Manual" operation is the same as that just described with the difference that the feeding of the sheeting will continue as long as the random button "R" is held down, and the interlock relay is not tripped out but releases the moment the random button "R" is released, since the trip coil 128 is energized now simultaneously with the interlock coil 127.

Moreover, the cancellation coil 117 is not needed, and as mentioned, is disabled at this time at contacts 162, the reason being that there is no detent lock on the detent bar 116 for the random button "R." In practice, the detent for this particular button is actually filed off.

The usual range of feeding on automatic preselection is from four to thirty-six inches; but on random feed there is no upper limit, and in order to prevent injury to the rotary measuring switch gears the gear 90 has a drop-out mutilation 90X (Figs. 10 and 12) into which the driving pinion 91 drops and idles when the wipers and index pin 105 have traveled their limit.

Should the measurement be desired in half-inches the "increment switch" (Fig. 12) is set to close contacts 134X instead of 134, thus connecting the inner ring of contacts 78 to the selector switch conductor 135, instead of the outer-ring contacts 77, as in the preceding example, it being observed that each inner-ring contact is positioned angularly beyond its companion outer-ring contact by an amount half-way toward the next succeeding outer-ring contact, and since the latter are separated angularly to produce one-inch selection intervals, the inner-ring contacts each represent an additional angular travel corresponding to an added half-inch.

When the stock roll 18 is tubular stock of suitable commercially available plastic sheeting, the machine can operate as a bag maker, and to this end the heat-sealing means coacts with the cut-off or knife 39, it being simply necessary to close a heater switch 180 (Fig. 12) to connect to a transformer primary 181 for feeding low-voltage, high amperage current via conductors 55 to the heater element 54, the latter descending with the knife and meeting the plastic stock in advance of contact of the knife therewith so that additional sealing time is afforded.

Bag-making may desirably be a continuous-feed process, and usually the machine is set for automatic continuous feeding and cut-off, with the heater or sealing means energized, as aforesaid.

Accordingly, the outfeed or conveyor belt 60 is connected for continuous operation as well as for intermittent operation in synchrony with the like operation of the feeding and cut-off means, as will now appear with reference to the circuit scheme shown in Fig. 1, wherein the outfeed motor 62, which drives the belt 60 at reduced speed through a gear-belt means 63, is energized via a normally closed manual cut-out switch 67 connecting with the energizing conductor 146 for the knife motor 42, "automatic" relay coil 165, etc.

Thus, assuming the manual cut-out switch 67 to be closed, motor 42 is energized via closed cam switch contacts 148—149, power is also connected to conductor 146 to energize the outfeed belt motor 62 at the same time, whether the sheet-feeding is "automatic" or "manual"; and for bag making, the machine is set for *automatic* operation by closure of control switch contacts 164, thereby energizing the "automatic" relay coil 165, thereby cutting out the selector switch means by opening the ground conductor 156 at "automatic" relay contacts 155 intermittently as the latter relay coil 165 is pulsed from conductor 146 responsive to the previously described operations of feed motor cam switch contacts 148—149.

If special control of the outfeed motor operation is required, as to cut it out entirely, or to run it continuously independently of the feeding and cut-off means altogether, the switch means 67 may be moved to open-circuit (N.C.) condition or to contact 67A.

I claim:

1. A machine of the class described including sheet-feeding means and a driving motor therefor; sheet cut-off means and a driving motor therefor; outfeed conveyor means for cut sheets and a driving motor therefor; selectively operable measuring-switch and circuit control means connected for operation to actuate said feeding motor to feed selected lengths of sheet; cut-off circuit means connected for control by said measuring-switch and circuit control means to actuate said cut-off motor at the conclusion of each feeding actuation of the feeding motor as aforesaid; and further circuit means cooperable with said measuring-switch and circuit control means and connecting with said outfeed motor for actuating of the latter concurrently with the actuation of the feeding motor as aforesaid.

2. In a web-feeding machine, in cooperative combination, a feed motor and feed means driven thereby for paying out webbing in a horizontal plane; a web cutter extending in a horizontal direction and reciprocable vertically across the fed web, and a cutter motor for driving the cutter; an outfeed conveyor belt travelling in a horizontal plane away from said cutter and positioned in maximum close proximity to the latter for engagement by the cut portion of the web; a conveyor motor driving said conveyor belt; control circuit means including pre-selecting measuring switch and control switch means having connection with all of said motors and operating in control cycles to energize said feed motor and said conveyor motor concurrently in each control cycle to feed pre-selected lengths of web while actuating said cutter motor only following conclusion of each cyclic energization of the feed motor under control of the pre-selecting measuring switch and control switch means as aforesaid; together with automatic circuit control means including a switch connecting with said control circuit means and operable to cause repetitious energizations of said motors in the order set forth under control of said pre-selecting switch means for repetitiously feeding and cutting any length of web determined by a selective operation of the pre-selecting switch means.

3. In a web-feeding machine, roller means for feeding webbing; a feed motor driving said roller means; a measuring switch including a rotary control member driven in synchrony with said roller means; a normally operative but releasable driving connection between said roller means and said rotary control member; electrically controlled release means operable to release said driving connection; manually pre-set length selecting switch means cooperable with said measuring switch for determining the length of webbing to be fed; and including relay means and operating connections controlled jointly by said selecting switch means and said measuring switch for starting and stopping said feed motor and determining the length of webbing fed; cutter means for cutting the fed webbing; a cutter motor operable to actuate said cutter means; a cutter relay; a cutter cam switch; an index switch actuated by said rotary control member of the measuring switch; and circuit connections controlled by said cutter relay, cutter cam switch and said index switch for energizing the cutter motor following termination of measuring operation of said rotary control member and an operation of said first-mentioned relay means thereby, and for energizing said electrical release means for the driving connection aforesaid, and for stopping said cutter motor following completion of a cutting operation of the cutter means thereby.

4. In a machine for feeding and cutting sheeting and webbing, feed roller means, and an outfeeding conveyor belt at the outfeed side of said roller means driven concurrently therewith; a knife carrier reciprocable up and down toward the fed material between said rollers and belt, a knife on said carrier; hold-down roller means carried on rockers and engaging the fed material on the conveyor belt; and rocking means actuated by said carrier for moving said holddown roller means away from the fed material on the conveyor belt when said carrier moves the knife to cut the material.

5. In a web-feeding measuring and cutting machine in cooperative combination: web-feeding means and a driving motor therefor; web-cutting means and a driving motor therefor; an out-feed conveyor positioned relative to said feeding and cutting means to receive cut lengths of the web and convey same away from the cutting means; a motor driving said conveyor means; and control switch means including starting switch means, measuring switch means, and relay switch means connected in operative circuit with said motors for operation to start and stop the same in predetermined sequence responsive to each actuation of said starting switch means, whereby the first-mentioned feeding motor operates to feed a measured length of said web, and said second-mentioned cutting motor and the third-mentioned conveyor motor are both operated subsequently to cut said length from the web and convey the cut length away from the cutting means.

6. Apparatus comprising web-feeding mechanism and an electric driving motor therefor designated a feed motor; a web-cutter positioned transversely of the path of travel of a web fed by said mechanism and operable to sever such web; a cutter motor for operating said cutter; an outfeed conveyor mounted to lead away from said cutter in the direction of web travel toward the cutter; a cutter operating motor; and control circuit means for connecting and disconnecting operating power to said motors and including a starting switch, relay means, and a manual selecting switch connected for operation to actuate said feed cutter, and outfeed motors responsive to actuation of said starting switch in any of several sequential relations, depending upon selective operation of said manual selecting switch, one of which provides for starting and stopping operation of the feed and outfeed motors in unison followed by operation of said cutter motor; and another of which provides for starting and stopping said feed and cutter motors sequentially in that order with no operation of said conveyor motor; and still another of which provides for a continuous operation of said conveyor motor with intermittent sequential operation of said feed and cutter motors in that order following operation of the manual selecting switch as aforesaid.

References Cited in the file of this patent

UNITED STATES PATENTS

| | | |
|---|---|---|
| 1,960,945 | Krueger | May 29, 1934 |
| 2,305,010 | Kenney et al. | Dec. 15, 1942 |
| 2,340,510 | Corley et al. | Feb. 1, 1944 |
| 2,392,183 | Phillimore | Jan. 1, 1946 |
| 2,456,018 | Peterson | Dec. 14, 1948 |
| 2,474,917 | Schenk | July 5, 1949 |
| 2,629,440 | Shaw | Feb. 24, 1953 |
| 2,641,304 | Biddinger | June 9, 1953 |
| 2,652,879 | Keller et al. | Sept. 22, 1953 |
| 2,665,757 | Stevens et al. | Jan. 12, 1954 |
| 2,677,029 | Van Valkenburgh | Apr. 27, 1954 |
| 2,679,280 | Marsh | May 25, 1954 |
| 2,698,046 | Finke | Dec. 28, 1954 |
| 2,707,985 | Binnall | May 10, 1955 |
| 2,727,570 | Hempel | Dec. 20, 1955 |
| 2,742,080 | Cloud | Apr. 17, 1956 |
| 2,748,861 | Von Stoeser | June 5, 1956 |
| 2,785,748 | Von Stoeser et al. | Mar. 19, 1957 |
| 2,796,913 | Fener et al. | June 25, 1957 |
| 2,805,700 | Klasing et al. | Sept. 10, 1957 |